Oct. 10, 1939.     R. EHRLICH     2,176,006
EYESHIELD
Filed June 7, 1938
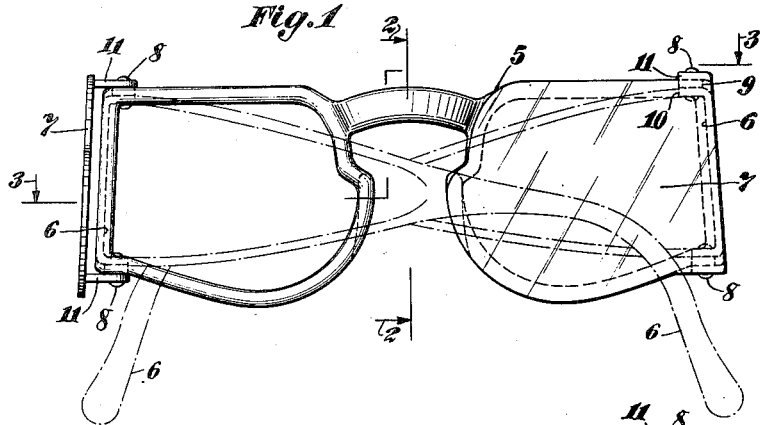
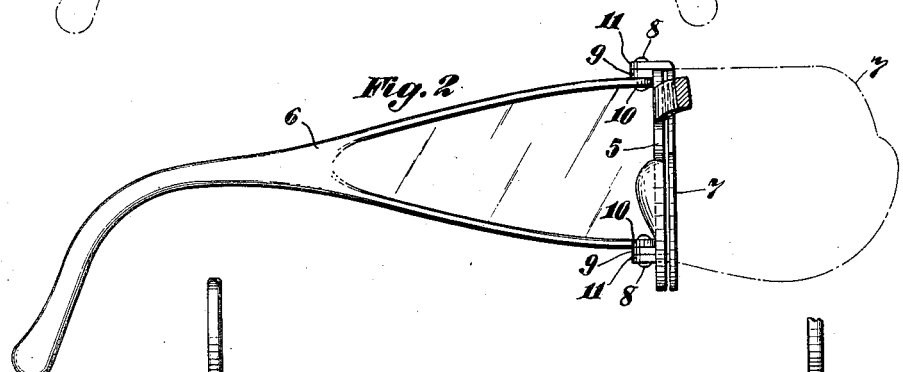
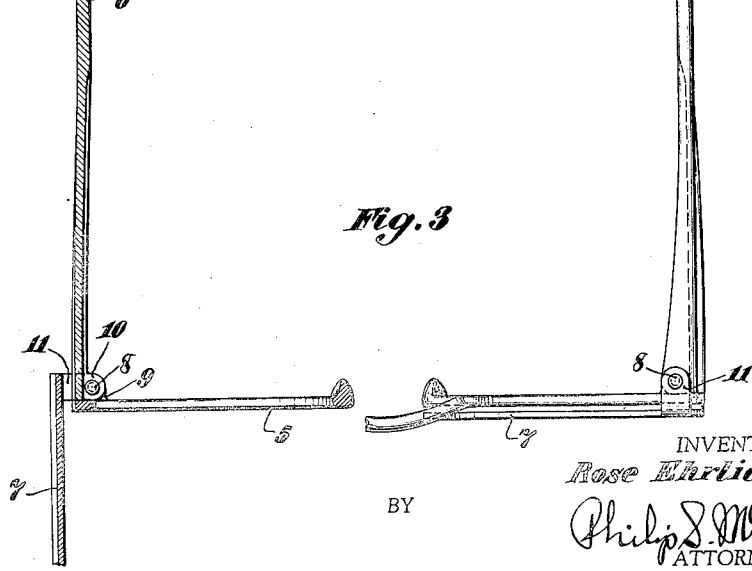
INVENTOR.
Rose Ehrlich,
BY
Philip S. McKean
ATTORNEY.

Patented Oct. 10, 1939

2,176,006

UNITED STATES PATENT OFFICE 2,176,006

EYESHIELD

Rose Ehrlich, New York, N. Y., assignor to Lapin-Kurley Kew, Inc., New York, N. Y., a corporation of New York Application June 7, 1938, Serial No. 212,220

1 Claim. (Cl. 2—13)

The invention disclosed herein relates to shields for protecting the eyes from the glare of the sun, wind, etc.

Special objects of the invention are to provide an article of this type, which will effectively protect the eyes and which can be immediately adjusted when so required to permit full and clear vision for reading and other purposes.

Other desirable objects and the novel features of construction, combination and relation of parts comprising the invention will appear as the specification proceeds.

The drawing accompanying and forming part of the specification illustrates one commercial embodiment of the invention. Structure however may be modified and changed, without departure from the true spirit and broad scope of the invention as hereinafter defined and claimed.

Fig. 1 is a front view of one of the sun shields showing one of the eye shielding members in open position and the other closed.

Fig. 2 is a sectional view as on line 2—2 of Fig. 1.

Fig. 3 is a broken sectional view as on substantially the line 3—3 of Fig. 1.

In the drawing, the device is shown as consisting of an open frame 5, with hinged temples 6, and hingedly mounted eyeshields 7, which can be individually opened up or closed in over the eyes.

All these parts, that is, the frame, the temples and the eyeshields may be made of molded plastic, transparent or translucent, and clear or tinted in various colors. The shields and temples in particular may be in various amber, rose, green, indigo and other shades desirable for eye shielding purposes and the individual shields, being separate elements may be in the same or different shades and may be the same as or different shades from the temples.

The parts are shown connected by the same hinge elements, namely short hinge pins 8, extending through aligned or co-acting flange or lug elements 9, 10, 11, of the frame, the temples and shields respectively. In this particular disclosure, the lugs 9, project rearwardly from the upper and lower edges at the ends of the frame, the lugs or flanges 10, are at the upper and lower edges at the front ends of the temples and engage between the spaced upper and lower frame lugs 9, while the lugs 11, project rearwardly from the upper and lower edges, at the outer ends of the shields 7, and engage over the outside of the spaced frame lugs 9. The hinge pins 8, can thus be simply short rivets pivotally securing these parts together and holding them frictionally in different parts of adjustment.

At their inner ends, the eye shielding portions 7, may be shaped to match the shape of the frame, thus to appear, if desired, as ordinary eye glasses.

The structure is particularly simple and inexpensive, easily assembled, is light in weight and each eyeshield being independently adjustable, may be turned out or in at will, to allow free vision or provide as much or as little protection desired for each eye. Turned at different angles, the adjustable portions 7, may be used as adjustable windshields.

What is claimed is:

An eyeshield, comprising an open frame, vertically spaced rearwardly projecting lugs at the opposite ends and at the upper and lower edges of said frame, wide temples of eye shielding material having inwardly projecting lugs at the forward ends of the same spaced to correspond to the distance between the vertically spaced lugs at the ends of the frame and disposed between said vertically spaced frame lugs, individual eyeshields over the front of said open frame and having rearwardly projecting lugs at the outer ends of the same extending rearwardly over the upper and lower edges at the ends of the frame into position above and below said vertically spaced rearwardly extending frame lugs and pivots extending through said eyeshield lugs, frame lugs and the temple lugs disposed between said frame lugs and thereby pivotally securing said individual eyeshields over the front of said frame and said light shielding temples to the back of said frame.

ROSE EHRLICH.